Figure 8:
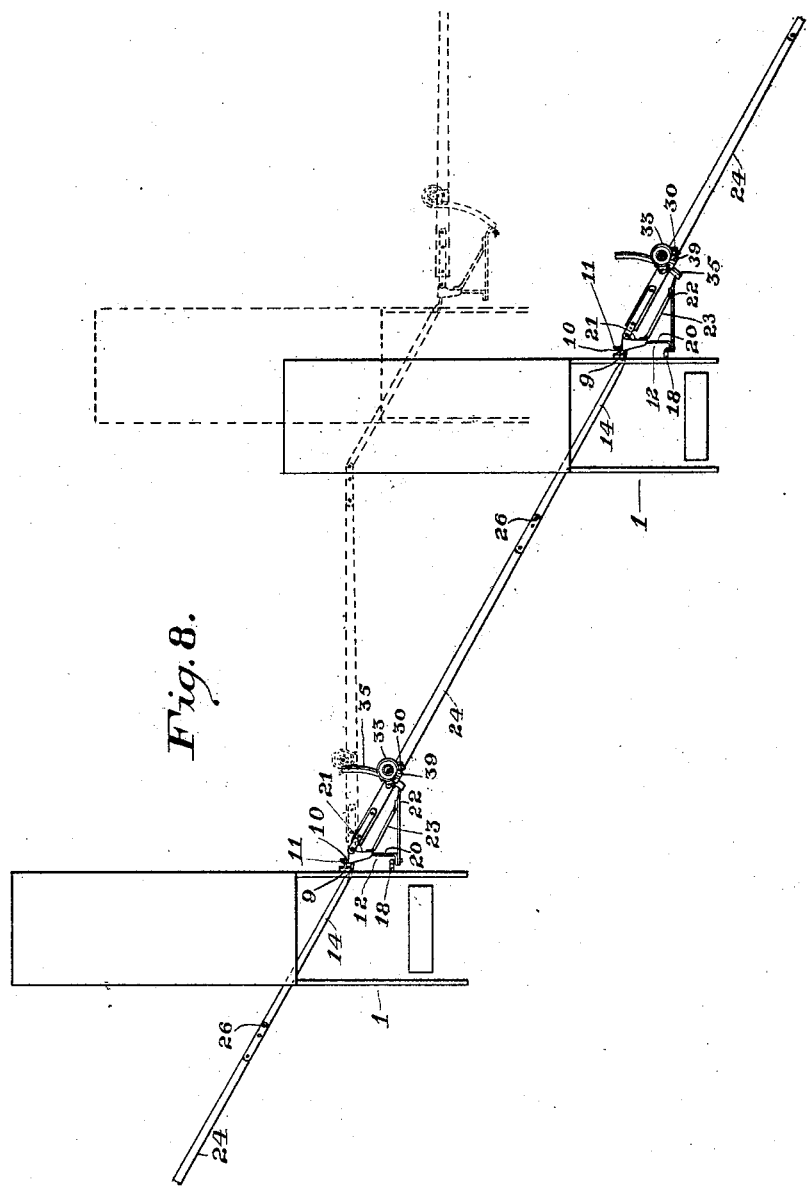

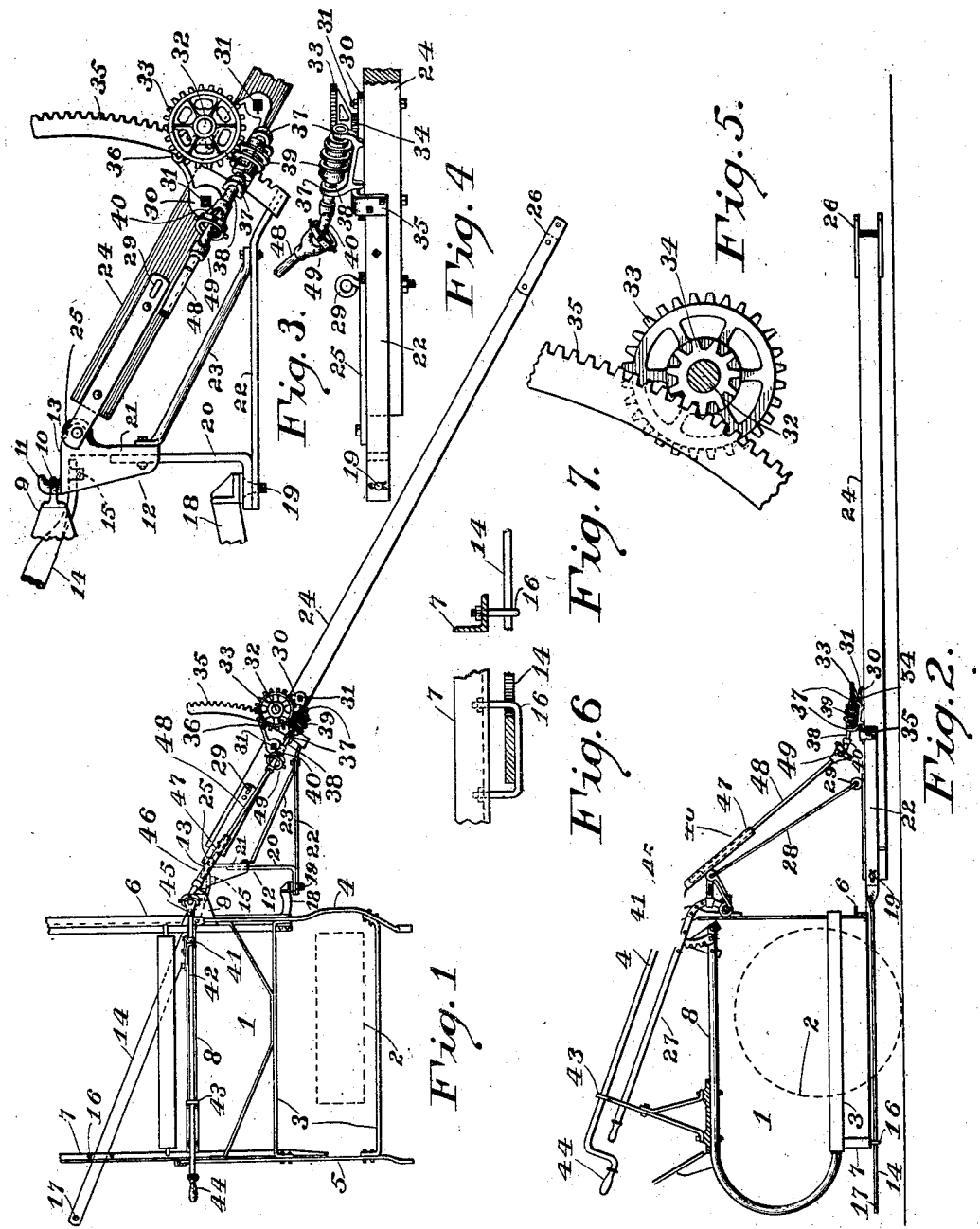

A. L. JOHNSON & H. B. SPERRY.
TANDEM DRAFT CONNECTION FOR HARVESTERS.
APPLICATION FILED APR. 1, 1911.

997,917.

Patented July 11, 1911.

2 SHEETS—SHEET 2.

Witnesses:
C. C. Palmer
F. W. Hoffmeister

Inventors.
Andrew L Johnson
And Herbert B. Sperry.
By E.W. Burgess
Attorney.

UNITED STATES PATENT OFFICE.

ANDREW L. JOHNSON AND HERBERT B. SPERRY, OF CHICAGO, ILLINOIS, ASSIGNORS TO INTERNATIONAL HARVESTER COMPANY, A CORPORATION OF NEW JERSEY.

TANDEM DRAFT CONNECTION FOR HARVESTERS.

997,917. Specification of Letters Patent. Patented July 11, 1911.

Application filed April 1, 1911. Serial No. 618,349.

*To all whom it may concern:*

Be it known that we, ANDREW L. JOHNSON and HERBERT B. SPERRY, citizens of the United States, residing at Chicago, in the county of Cook and State of Illinois, have invented certain new and useful Improvements in Tandem Draft Connections for Harvesters, of which the following is a specification.

Our invention relates to mechanism whereby a series of grain harvesters or other implements may be connected together in tandem relation and drawn forward by a single source of power, as a traction engine connected with the front machine of the series, and consists in providing draft connections between the separate harvesters and between the series and the source of power that may be manipulated in a manner to control the line of advance of one machine independent of the others in a manner whereby a greater or less width of swath may be cut by either unit of the series. The object of our invention being to provide a mechanism that may be operated in a positive manner by the operator from his position upon the harvester to control the line of advance of the machines, strong in its construction and efficient in operation. These objects are attained by means of the mechanism illustrated by the accompanying drawings, in which—

Figure 1 is a top plan view of part of a harvester frame sufficient to illustrate the manner of attaching our improved draft connection thereto; Fig. 2 is an end elevation of Fig. 1; Fig. 3 is a detached detail of the draft connection on a large scale, with some of the parts cut away; Fig. 4 is a side elevation of Fig. 3; Fig. 5 is a detail, on an enlarged scale, of part of the draft adjusting mechanism, being a bottom view; Fig. 6 is a detail showing the manner of connecting the rear end of the reach bar of the draft connection with the rear sill of the harvester frame; Fig. 7 is a vertical cross section of Fig. 6; and Fig. 8 is a plan view illustrating the application of our tandem draft connection to a series of trailing harvesters and the manner of adjusting it to vary the line of draft of one machine relative to the other.

The same reference characters designate like parts throughout the several views.

1 represents a harvester including a traction wheel 2, a wheel frame having frame members 3 upon opposite sides of the wheel and front and rear members 4 and 5, respectively, that are secured to opposite ends of frame members 3; 6 and 7 front and rear sill members, respectively, of the grain platform having their stubbleward ends secured to the wheel frame, and 8 represents a seat supporting member forming part of the harvester frame.

9 represents a bracket secured to the front sill of the grain platform at its delivery end and having an eye 10 at its forward end that receives a hook 11 integral with a draft bracket 12, the bracket having a depending web 13 upon its grainward end, to which is connected the forward end of a reach bar 14 by means of a pin 15, the reach bar extending rearward and grainward under the grain platform and having its rear end connected with the rear sill of the grain platform by means of a stirrup 16, and an opening 17 near its extremity, whereby the reach bar may be connected with the draft tongue of a trailing machine.

18 represents a supplemental bracket secured to the front sill of the grain platform at its stubbleward end and having a stem 19 projecting stubbleward from its front end and in axial alinement with the eye 10 of the bracket member 9.

20 represents a connecting bar arranged parallel with the grain platform and having its grainward end secured to a web portion 21 forming part of bracket 12, and its stubbleward end turned rearward and provided with an opening that loosely receives the stem 19 of the supplemental bracket.

22 represents a draft member extending forward at right angles with the harvester and having its rear end pivotally connected with the stem 19, and 23 represents a supplemental draft member having its forward end secured to member 22 and inclined rearward and grainward is secured at its rear end to bracket 12.

24 represents a draft tongue having its rear end pivotally connected with an ear member 25 integral with bracket 12 in a manner permitting the tongue to swing in a lateral direction relative to the line of draft of the machine, the tongue being provided at its front end with draft connecting means 26 whereby it may be connected with the reach bar of another like draft mechanism connected with a harvester, or with a traction engine.

27 represents a common form of tilting lever pivotally mounted upon the harvester frame and connected with the draft tongue by means of a link 28 and an eye bolt 29.

30 represents a plate secured to the upper side of the draft tongue by means of bolts 31; 32 is a vertically arranged stud forming part of the plate, and 33 is a worm wheel journaled upon the stud and having integral therewith a pinion 34 that meshes with a rack 35 arranged concentric with the axis of the tongue connection with the bracket 12, the stubneward end of the rack being secured to the front end of draft member 22. The gear teeth of pinion 34 are shrouded at their upper ends, the shroud overlapping the rack in a manner to secure it in operative relation with the rack, and 36 represents a lip portion upon the plate that engages with the rear edge of the rack in a manner to hold it in mesh with the pinion.

37 represents upwardly extending ears integral with the plate 30 and provided with openings therein that are substantially in line with the tongue, and journaled in the openings is a short shaft 38, upon which is secured a worm 39 that engages with the worm wheel 33, and 40 represents a universal coupling member secured to the rear end of the shaft.

41 represents a bracket secured to the front end of the seat supporting pipe of the harvester, and inclined forward and upward is provided with an opening at its upper end in which is journaled a shaft 42 that inclines forward and downward in the direction of the line of draft of the machine, the forward end of the shaft being journaled in the upper end of a bracket 43 secured to the rear end of the seat supporting pipe. The rear end of the shaft is provided with a hand crank 44, and 45 represents a universal coupling member secured to the front end of the shaft and forming part of the coupling mechanism that connects the shaft with a coupling member 46 that is provided with a sleeve portion 47 that telescopically receives the upper end of a shaft 48 that inclines downward and forward and has its lower end connected by means of a universal coupling mechanism 49 with the short shaft 38.

The operator may rotate the short shaft with its worm by means of the crank 44 in a manner to change the angular relation of the draft tongue relative to the harvester and thus cause each machine to advance in a predetermined path relative to the path of the source of power within the range of adjustment of the tandem draft connections, as shown in Fig. 8.

What we claim as our invention, and desire to secure by Letters Patent, is:

1. A tandem draft connection for use in connection with agricultural implements including, in combination, a draft tongue pivotally connected with an implement in a manner to swing laterally relative to the line of draft of the machine, a reach bar extending from the tongue connection to the rear of the implement, means for adjusting the angular relation of said draft tongue and the implement, said means including a toothed rack concentric with the pivotal axis of said tongue and secured against lateral movement relative to said implement, a combined worm wheel and pinion mounted upon said tongue, said pinion engaging with said rack, a worm journaled upon said tongue and engaging with said worm wheel, and means extending to the rear of the implement and operative to rotate said worm in either direction.

2. A tandem draft connection for implements including, in combination, a draft frame having its rear end pivotally connected with the implement in a manner to swing upward or downward at its forward end, a draft tongue pivotally connected with said draft frame in a manner permitting it to swing laterally relative to the line of draft of the machine, a reach bar having its forward end connected with said draft frame and extending rearward therefrom in rear of the implement, means for adjusting the angular relation of said draft tongue and said implement, said means including a toothed rack concentric with the pivotal axis of said draft tongue and secured to the front end of said draft frame, a combined worm wheel and pinion mounted upon said tongue, said pinion engaging with said rack, a worm journaled upon said tongue and engaging with said worm wheel, and means extending to the rear of the implement and operative to rotate said worm in either direction.

A. L. JOHNSON.
H. B. SPERRY.

Witnesses:
H. B. MUEHLHAUSEN,
P. N. SHEA.